US006151030A

United States Patent [19]

DeLeeuw et al.

[11] Patent Number: 6,151,030

[45] Date of Patent: Nov. 21, 2000

[54] METHOD OF CREATING TRANSPARENT GRAPHICS

[75] Inventors: William C. DeLeeuw, Hillsboro; Kenneth L. Knowlson, Portland, both of Oreg.

[73] Assignee: Intel Corporation, Santa Clara, Calif.

[21] Appl. No.: 09/085,548

[22] Filed: May 27, 1998

[51] Int. Cl.[7] .................... G06F 17/30

[52] U.S. Cl. .................... 345/435; 345/431; 345/344; 345/139; 345/136

[58] Field of Search .................... 345/431, 430, 345/432, 429, 136, 139, 511, 435, 433, 186, 344; 358/1; 348/595, 275

[56] References Cited

U.S. PATENT DOCUMENTS

| | | | |
|---|---|---|---|
| 4,513,312 | 4/1985 | Takemura | 348/275 |
| 4,727,365 | 2/1988 | Bunker et al. | 345/139 |
| 5,282,037 | 1/1994 | Eguchi et al. | 348/595 |
| 5,293,467 | 3/1994 | Buchner et al. | 345/422 |
| 5,307,452 | 4/1994 | Hahn et al. | 345/432 |
| 5,668,940 | 9/1997 | Steiner et al. | 345/429 |
| 5,831,615 | 11/1998 | Drews et al. | 345/344 |
| 5,850,232 | 12/1998 | Engstrom et al. | 345/511 |
| 5,852,443 | 12/1998 | Kenworthy | 345/431 |
| 5,883,632 | 3/1999 | Dillinger | 345/431 |
| 5,933,578 | 4/1999 | Van de Capelle et al. | 358/1.9 |
| 5,999,161 | 12/1999 | Frank et al. | 345/435 |
| 6,038,031 | 3/2000 | Murphy | 345/136 |
| 6,043,811 | 3/2000 | Kato et al. | 345/186 |
| 6,043,829 | 3/2000 | Inoue | 345/519 |

OTHER PUBLICATIONS

Harrison et al, "Transparent Layered User Interfaces: An Evaluation of a Display Design to Enhance Focused and Divided Attention," CHI '95 Proceedings Papers, pp. 1–10, printed Apr. 20, 1998.

Cox et al., "The Usability of Transparent Overview Layers," GroupLab, The University of Calgary, pp. 1–4, printed Feb. 24, 1998.

"Direct Draw Objects," mk:@ivt:directx/dire/dire0045.htm, 1 page, printed Apr. 20, 1998.

"Direct Draw Surface Objects," mk:@ivt:directx/dire/dire0064.htm, 1 page, printed Apr. 20, 1998.

"Creating Surfaces," mk:@ivt:directx/dire/dire0066.htm, 2 pages, printed Apr. 20, 1998.

"Frame–Buffer Access," mk:@ivt:directx/dire/dire0067.htm, 1 page, printed Apr. 20, 1998.

"Flipping Surfaces and GDI's Frame Rate," mk:@ivt:directx/dire/dire0068.htm, 2 pages, printed Apr. 20, 1998.

"IDirectDraw2::CreateSurface," mk:@ivt:directx/dire/dire0121.htm, 1 page, printed Apr. 20, 1998.

"IDirectDrawSurface2::Blt," mk:@ivt:directx/dire/dire0154.htm, 3 pages, printed Apr. 20, 1998.

"IDirectDrawSurface2::Flip," mk:@ivt:directx/dire/dire0160.htm, 1 page, printed Apr. 20, 1998.

"IDirectDrawSurface2::GetDC," mk:@ivt:directx/dire/dire0166.htm, 1 page, printed Apr. 20, 1998.

"IDirectDrawSurface2::Lock," mk:@ivt:directx/dire/dire0175.htm, 2 pages, printed Apr. 20, 1998.

*Primary Examiner*—Mark R. Powell
*Assistant Examiner*—Thu-Thao Havan
*Attorney, Agent, or Firm*—Steven P. Skabrat

[57] ABSTRACT

A method of creating transparent graphics for display in a computer system. A first frame buffer is provided to store display components to be displayed transparently on a computer monitor, the display components having a plurality of pixels. A second frame buffer is provided as a new output frame buffer. Pixels of the first frame buffer are color mixed with pixels of the computer system's original output frame buffer to produce color mixed pixels. The pixels of the output frame buffer are interleaved with the color mixed pixels, the interleaved pixels are stored in the second frame buffer, and the pixels of the second frame buffer are displayed. The color mixing is accomplished by a weighted average of the color components of the pixels of the first frame buffer and the output frame buffer. The interleaving is adjustable such that every second pixel, or every fourth pixel, or every eighth pixel, and so on, of the color mixed pixels is selected for inclusion in the second frame buffer, thereby changing the level of transparency of the displayed data.

28 Claims, 8 Drawing Sheets

METHOD OF CREATING TRANSPARENT GRAPHICS

BACKGROUND

1. Field

The present invention relates generally to graphical user interfaces and more specifically to generating transparent graphics.

2. Description

In the days of "dumb" terminals and early personal computers (PCs), a user could typically view only one set of information at a time on a computer display. With the advent of windowing features of graphical user interfaces in some operating system software, a user may view multiple sets of information in multiple windows shown on the display. In some cases, the windows are overlapping, and in other cases the windows are nonoverlapping (or tiled). While the windowing capability has proven advantageous for increasing the amount of information displayed to the user on a single display, it still is limited in that when two or more windows are overlapping, the window in the foreground obscures or blocks the user's view of the overlapped portion of the window in the background. The foreground window also blocks input access to the overlapped portion of the background window. The user typically must perform some action, such as a cursor movement, keyboard input strike or mouse input event, to cause the background window to be changed to the foreground window, thereby allowing the user to fully view its contents or provide input signals to the system.

One approach to overcoming this drawback of windowing systems is to provide the capability for simultaneous viewing of the entire contents of multiple overlapping windows through the use of transparency. Transparent windows contain display data wherein objects or images beyond the transparent window (e. g., in a background window or underlying display surface) may still be perceived by the user. Transparent effects are used in some computer software games to enable features such as "heads-up" display functions.

Current implementations of transparency have at least several disadvantages. The transparent effect is typically achieved by interleaving pixels from two display buffers without the ability to adjust the level of transparency. The transparency results in windows with inferior viewing quality because the pixel interleaving method produces "checkerboard" artifacts in the display. Furthermore, the transparent effects are limited to pre-defined, self-contained components of specialized application programs. As a result, it is difficult to provide transparency for or over application programs that do not provide transparency capabilities themselves.

Therefore a need exists for the capability to provide multiple general purpose, high quality transparent display layers over the top of normal computer display windows and background surfaces.

SUMMARY

An embodiment of the present invention is a method of creating transparent graphics. The method includes color mixing pixels of a first frame buffer with pixels of an output frame buffer to produce color mixed pixels. The method continues with interleaving pixels of the output frame buffer and the color mixed pixels, storing the interleaved pixels in a second frame buffer, and displaying the pixels of the second frame buffer.

BRIEF DESCRIPTION OF THE DRAWINGS

The features and advantages of the present invention will become apparent from the following detailed description of the present invention in which.

DETAILED DESCRIPTION

In the following description, various aspects of the present invention will be described. For purposes of explanation, specific numbers, systems and configurations are set forth in order to provide a thorough understanding of the present invention. However, it will also be apparent to one skilled in the art that the present invention may be practiced without the specific details. In other instances, well known features are omitted or simplified in order not to obscure the present invention.

An embodiment of the present invention is a method of providing a transparent layer of display data over the top of another layer of display data on a display so that the user may see both layers clearly and simultaneously. This capability doubles, in essence, the maximum screen area available on a display for use by application programs. One embodiment is a method for producing transparent computer graphics layers by interleaving (or alternating in a pattern) the pixels from one video frame buffer with the pixels from another video frame buffer. In this embodiment, the pixels from a first frame buffer are mixed by color averaging with corresponding pixels from a second frame buffer to reduce the "checkerboard" effect created by the use of spatial multiplexing alone. Additionally, because the degree of interleaving is adjustable and the color averaging may be weighted, the degree of transparency of the displayed images may be controlled.

In this embodiment, an output frame buffer used by operating system software is not affected by provision of the transparency feature and the operating system is unaware of the transparency operations. Hence, the transparency effect provided by embodiments of the present invention does not require modifications to application programs. Furthermore, input operations to background windows are not affected by transparent foreground windows.

An embodiment of the present invention operates by combining two frame buffers of computer graphics output data or video data in the form of electrical signals. The pixels of the output, or visible, frame buffer are created by spatially interleaving the contents of two input frame buffers. The interleaving in this embodiment is accomplished by alternating pixels of one frame buffer with those of the other frame buffer. This results in the visual illusion of two displays of images layered one on another. As the pixels are being interleaved, the pixels of the first frame buffer are color averaged with the pixels of the second frame buffer that they are about to replace. Color averaging is performed on the pixels of one frame buffer by averaging them with the corresponding pixels of the other frame buffer prior to, or during, interleaving them into the output frame buffer. The result comprises multiple overlapping images being substantially simultaneously visible on a display such as a computer monitor, for example.

Figure 1:
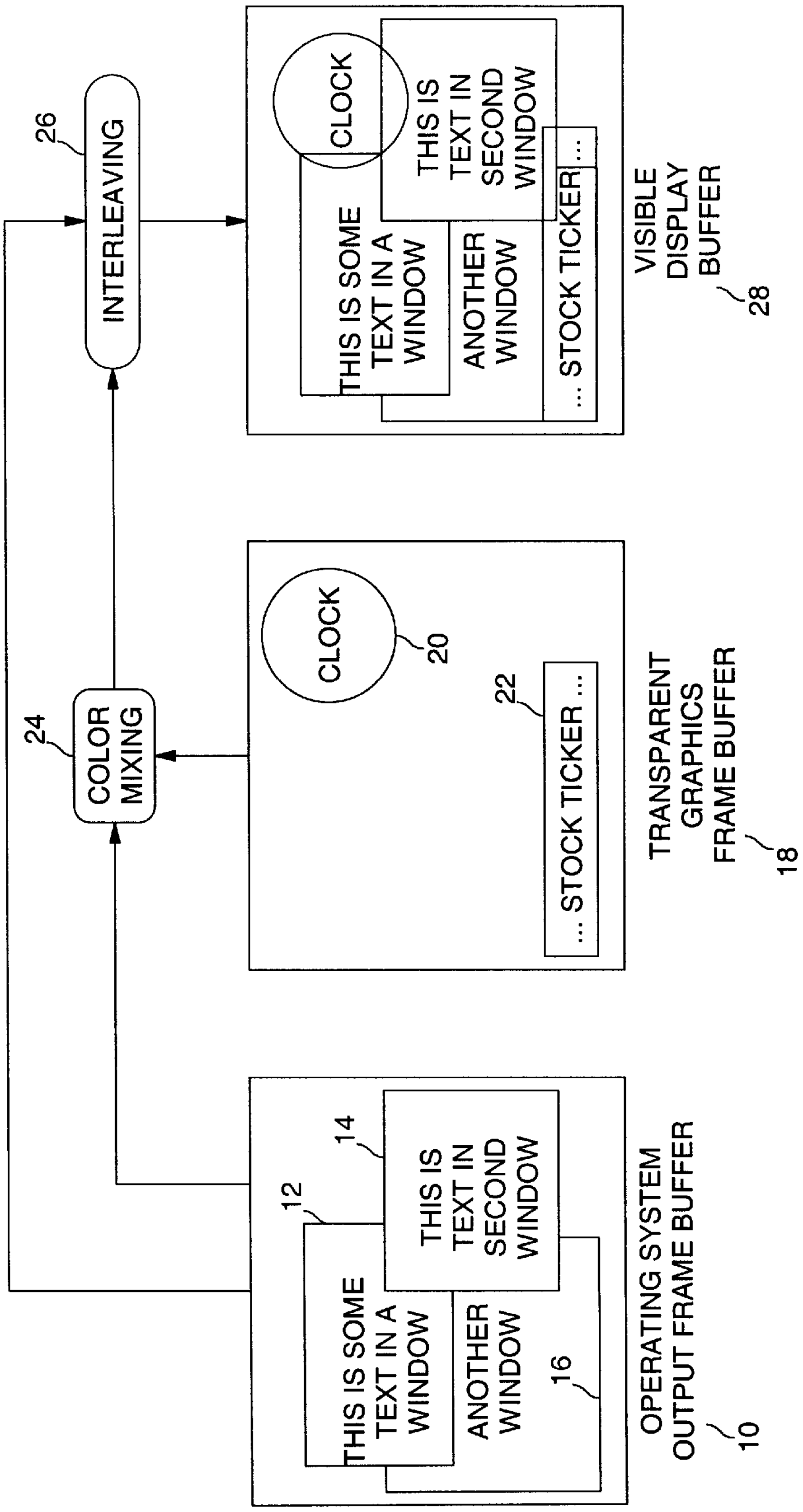
FIG. 1 is a diagram illustrating an example of transparent graphics displayed with operating system output graphics according to an embodiment of the present invention.

FIG. 1 is a diagram illustrating an example of transparent graphics displayed with operating system output graphics according to an embodiment of the present invention. Operating system output frame buffer 10 is an area of memory used to store the current display data of the computer system (not shown). The operating system output frame buffer may be allocated in any memory available to the operating system. A frame buffer is a set of storage locations to store a two-dimensional array of pixel data. The operating system output frame buffer may be associated with operating system software of the computer system, which controls the generation and display of the data signals on a computer monitor (not shown). In one embodiment, the operating system software comprises the Windows 95® or Windows NT® operating system software available from Microsoft Corporation, although other operating system software supporting graphical user interfaces may also be employed. In this example, the operating system output frame buffer 10 contains application program display data signals for three overlapping windows shown pictorially in FIG. 1 and labeled 12, 14, and 16, respectively.

Transparent graphics frame buffer 18 is an area of memory used to store the display data of transparent graphics for substantially simultaneous display with the display data signals of the operating system output frame buffer. This area of memory may be allocated in any memory available in the system. In this example, display components such as a clock 20 and stock ticker 22 are shown as sample application program display features which illustrate the use of transparency, although generally any display components may be made transparent through the use of embodiments of the present invention.

The display components of the operating system output frame buffer and the transparent graphics frame buffer may be combined by color mixing 24 the corresponding pixels of each buffer while interleaving the resulting pixels of the color mixing operation with the operating system output frame buffer's pixels to form the display components of visible display buffer 28. The visible display buffer shows in pictorial form the three overlapping windows 12, 14, and 16 with the clock 20 and stock ticker 22 displays appearing as transparent display components overlaying portions of the windows. In this example, the transparent display components are partially overlaying the other display components. However, it should be understood that the transparent display components may be entirely within the boundaries of one or more non-transparent windows or display components on the display. Of course, in certain application programs and with certain display components, the display of data from two display components with one substantially or even completely on top of the other may present image quality problems for the user. Nonetheless, in other application programs the ability to overlay transparent display components in a well designed manner is advantageous and desirable.

In addition, embodiments of the present invention allow transparent display components overlaying background windows to have little or no effect on input operations to a selected background window. For example, a user may interact with an input window of an application program being displayed in a background window while a transparent display component is partially or completely overlaying the background window. The operating system software may accept the user input events or key strikes to the input window (such as a mouse entry or text entry) without substantial interference with the display of the transparent display components.

Figure 2:
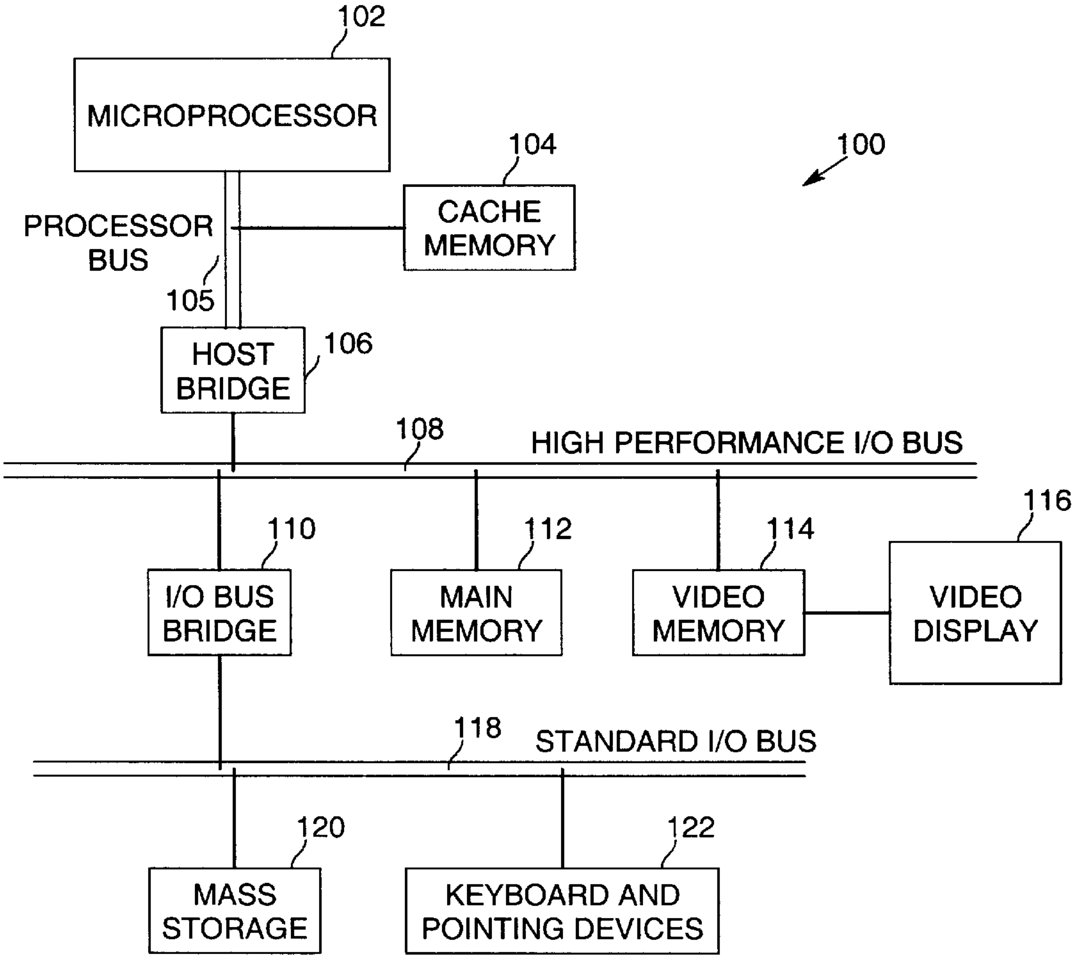
FIG. 2 is a diagram illustrating a sample computer system suitable to be programmed with a transparency method in accordance with an embodiment of the present invention.

In accordance with embodiments of the present invention, a method for producing transparency effects employs minimal mixing of display contents. Instead, it relies on the human eye's inability to distinguish between the color of adjacent pixels on a computer monitor (in essence, the human eye averages each pixel with its neighbor). Some mixing is employed, because large computer monitors and low display resolutions may result in a "checkerboard" effect when pixels are interleaved in this manner. In one embodiment, one half of the pixels from a first frame buffer (such as the operating system output frame buffer) are averaged with one half of the pixels from a second frame buffer (such as the transparent graphics frame buffer) as the pixels of the two frame buffers are interleaved into a display buffer whose data is currently being rendered visible on a display. By averaging a fraction of the pixels, there may be a decrease in the processing power used when providing the transparency effect. In alternate embodiments, different percentages of pixels may be averaged (e.g., one fourth of the pixels, one eighth of the pixels, one sixteenth of the pixels, one thirty-second of the pixels, or any one Nth of the pixels where N is a positive integer), and the percentages may be changed dynamically FIG. 2 is a diagram illustrating a sample computer system suitable to be programmed with in accordance with an embodiment of a method for producing transparency displays in accordance with the present invention. Sample system 100 may be used, for example, to execute the processing for the methods described herein. Sample system 100 is representative of computer systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. Sample system 100 includes microprocessor 102 and cache memory 104 coupled to each other through processor bus 105. Sample system 100 also includes high performance I/O bus 108 and standard I/O bus 118. Processor bus 105 and high performance I/O bus 108 are bridged by host bridge 106, whereas high performance I/O bus 108 and standard I/O bus 118 are bridged by I/O bus bridge 110. Coupled to high performance I/O bus 108 are main memory 112 and video memory 114. Coupled to video memory 114 is video display 116. Coupled to standard I/O bus 118 are mass storage 120, and keyboard and pointing devices 122.

These elements perform their conventional functions well known in the art. In particular, mass storage 120 may be used to provide long-term storage for the executable instructions for embodiments of methods for providing transparent displays in accordance with the present invention, whereas main memory 112 is used to store on a shorter term basis the executable instructions of embodiments of the methods for providing transparent displays in accordance with the present invention during execution by microprocessor 102.

Figure 3:
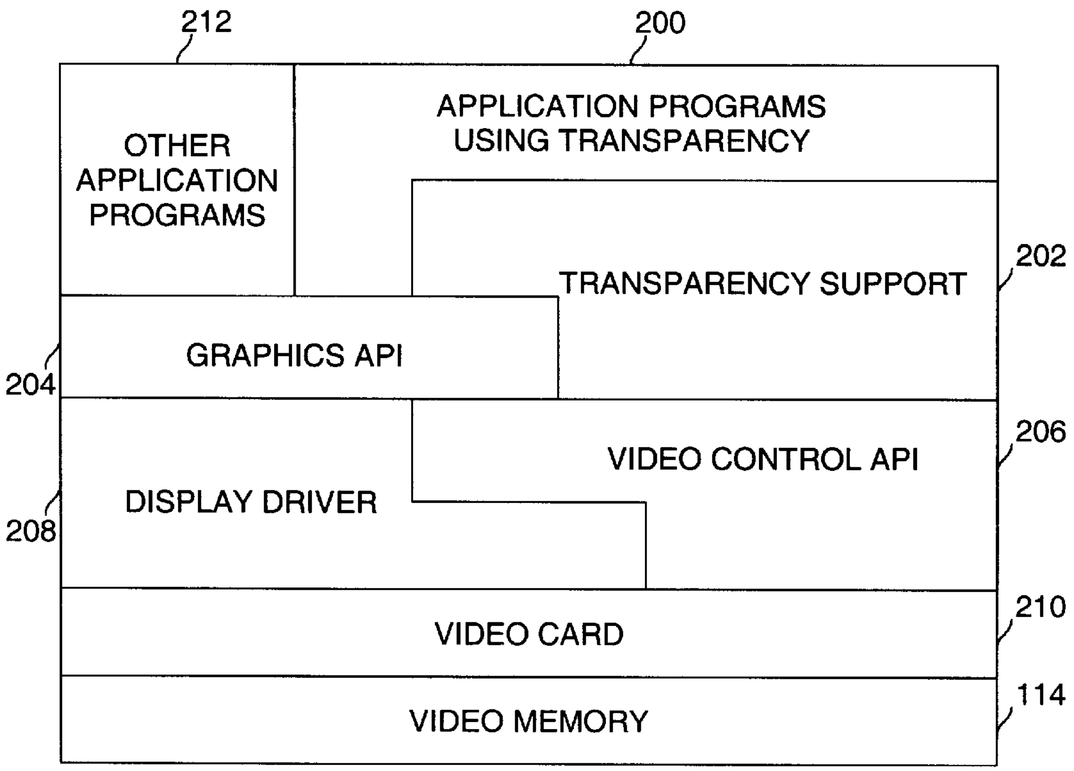
FIG. 3 is a diagram of a software and hardware stack for implementing transparent graphics according to an embodiment of the present invention.

FIG. 3 is a diagram of a software and hardware stack for implementing transparent graphics according to an embodiment of the present invention. Application programs 200 designed to use transparent display objects call functions provided by transparency support software 202 to define and update the transparent display objects. In response, transparency support 202 calls the operating system graphics rendering programming interface (graphics API) 204 in this embodiment. In the Windows95o operating system, this may be the Graphics Device Interface (GDI). The transparency support software 202 also calls the operating system's video hardware control abstraction programming interface (video control API) 206 in this embodiment. In the Windows95® operating system, this may be the DirectDraw API, available from Microsoft Corporation. In some operating systems, the graphics API 202 and video control API 206 may not be distinguishable from each other as they may exist within the same application programming interface. The graphics API 204 may be used to render requested graphics to the transparent graphics frame buffer 18 shown in FIG. 1. The video control API 206 may be used to control frame buffer visibility and to access the contents of all frame buffers. In this embodiment, the graphics API 204 and video control API 206 interact with display driver software 208 to communicate with video card 210. The video card 210 controls the video display in the system of FIG. 2. Video card accesses video memory 114 to obtain display data. Other application programs 212 which do not employ transparency interact with the graphics API 204 to create and update display objects.

Generally, images may be displayed on a display such as a computer monitor, for example, by creating a frame buffer of pixel data in video memory 114. This frame buffer may be designated as a visible portion of video memory by video control API 206. If there is a sufficient amount of video memory available, multiple frame buffers may be defined, only one of which may be used at a time (by the video card 210) to obtain the data signals for building the current visible display. In a wellknown double buffering technique, a first frame buffer is considered to be the "visible" buffer and the video card 210 reads data signals from it to obtain the current display data signals, while a second frame buffer (or "non-visible" buffer) is written to with new display data. In this embodiment, the video control API is then called upon to "flip" the frame buffers by designating the second frame buffer to be the visible buffer and designating the first frame buffer to be the non-visible buffer. Use of this technique provides for the smooth update of display data, resulting in aesthetically pleasing displays for the user. Embodiments of the present invention may extend this concept to employ extra frame buffers to provide the transparent display data signals in conjunction with normal display data.

Figure 4:
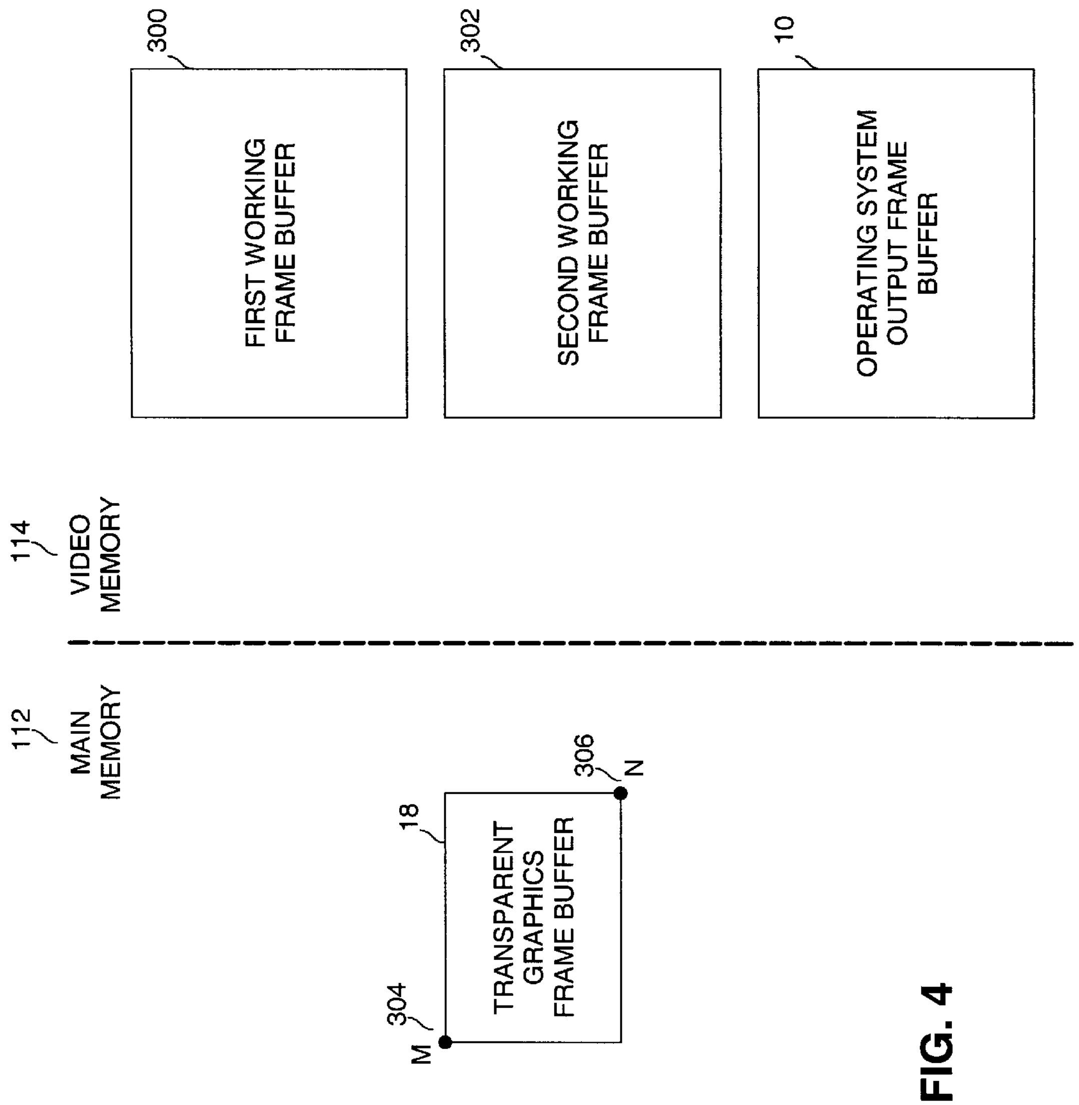
FIG. 4 is a diagram illustrating multiple frame buffers used for providing transparent graphics according to embodiments of the present invention.

FIG. 4 is a diagram illustrating an embodiment of multiple frame buffers used for providing transparent graphics. One designated portion of the video memory may be assigned to be displayed as visible on the computer monitor at a time. This is called the "visible display". That is, the visible display comprises the display data from an area of video memory that is currently displayed on the computer monitor for viewing by a user. Generally, in this embodiment the graphics API 204 of the operating system software writes data signals into the operating system output frame buffer 10. In most current systems, the operating system output frame buffer, resident in video memory 114, is used for the visible display. However, in embodiments of the present invention, other frame buffers may be used as the visible display. A first working frame buffer 300 and a second working frame buffer 302, both resident in video memory 114 or other accessible memory, store display data according to embodiments of the present invention. In this embodiment, each frame buffer stores an array of pixel data signals. The size of the array in this embodiment is dependent on the current display characteristics of the system. Frame buffer array sizes may, for example, be 640 pixels by 480 pixels, 800 pixels by 600 pixels, or 1280 pixels by 1024 pixels, or other appropriate sizes dependent on the computer monitor and operating system software settings. Each pixel includes red (R), green (G), blue (B), and optionally, opacity (A) components. Alternatively, other color coding schemes such as YUV or YUVA may also be used. Transparent graphics frame buffer 18, resident in main memory 112, in this embodiment stores transparent display data created by transparency support software 202, video control API 206, and graphics API 204.

In one embodiment, data signals from the transparent graphics frame buffer 18 may be color mixed and interleaved with data signals from operating system output frame buffer 10, and then stored in one of the working frame buffers. This mixed and interleaved data may be stored into a working frame buffer when the working frame buffer is in a "non-visible" state (that is, in this embodiment the data stored in the frame buffer is not currently displayed on the computer monitor). While one of the working frame buffers is being written to in a non-visible state, the other working frame buffer may be in a "visible" state and used as the source of current display data. When the color mixing and interleaving operations are complete for a working frame buffer, the non-visible working frame buffer may be designated the visible working frame buffer and vice versa. This double buffering process may be repeated at a rate of at least 8–15 times per second in this embodiment to provide a visually appealing display to a user.

In embodiments of the present invention, interleaving of the pixels of the transparent graphics frame buffer and the operating system output frame buffer may be accomplished as follows. In one embodiment, alternating pixels in the selected working frame buffer may be written by a mix of a transparent graphics frame buffer pixel value and a spatially corresponding operating system output frame buffer pixel value. The other pixels in the selected working frame buffer may be written with pixels from the operating system output frame buffer. In another embodiment, pixels from the operating system output frame buffer may be block transferred to the selected working frame buffer and pixels from the transparent graphics frame buffer may be subsequently spatially multiplexed and color averaged with the pixels of the selected working frame buffer.

Figure 5:
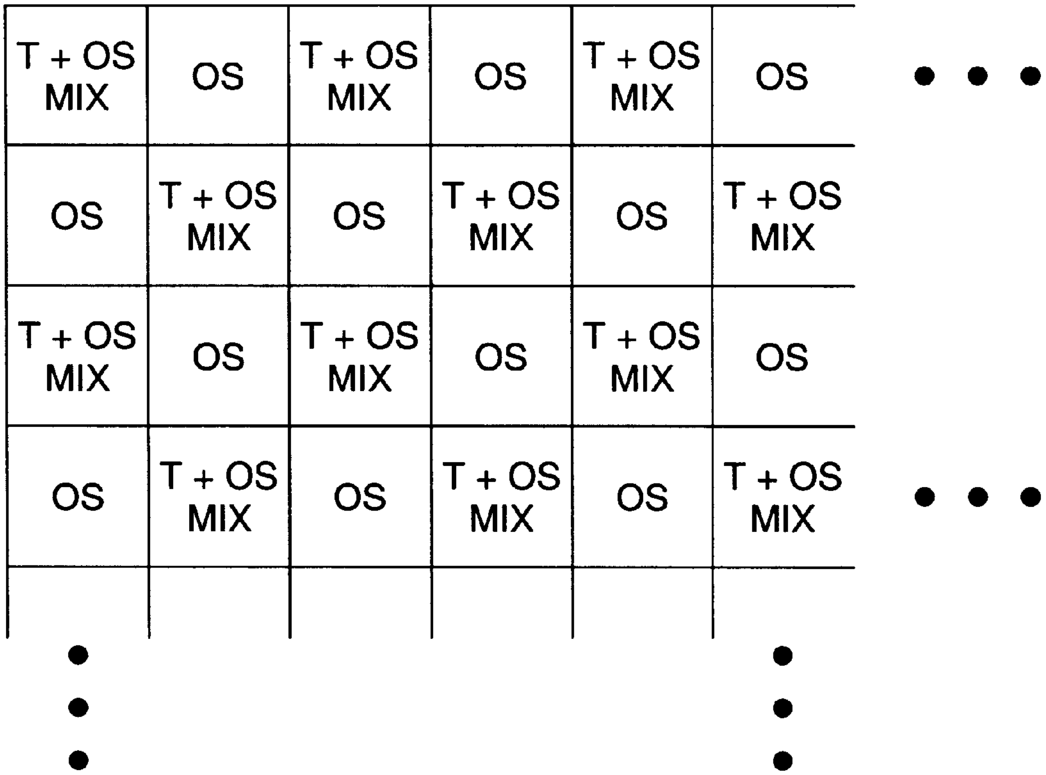
FIG. 5 is a diagram illustrating an alternating pixel technique mixing between the transparent graphics frame buffer and the operating system output frame buffer according to one embodiment of the present invention.

FIG. 5 is a diagram illustrating an embodiment of one method of alternating pixel mixing between the transparent graphics frame buffer and the operating system output frame buffer. A "T+OS Mix" pixel in the selected working frame buffer comprises a color averaged mix of a pixel from the transparent graphics frame buffer (the T value) and a pixel from the operating system output frame buffer (the OS value). An "OS" pixel in the selected working frame buffer contains a spatially corresponding pixel copied from the operating system output frame buffer. In this embodiment, color averaging may be performed through a weighted averaging scheme on each color component of each pixel from corresponding positions within the two frame buffers, although in other embodiments, different color mixing techniques may also be employed. In one embodiment, weighted averaging may be accomplished by multiplying a component value of a first pixel by a weight value and multiplying the same component value of a second pixel by a different weight value. The two weighted color components may then be added together and the resulting sum may be divided by the sum of the two weight values. This method is also known as alpha blending. By using this alternating pattern, the computer processing employed to create the transparent effect may be cut in half in comparison to a mixing of all pixels of the frame buffers. The pixel data movement within the video memory may be performed by a block transfer operation provided by the drawing API in this embodiment.

In other embodiments, the mixed pixels may comprise only one quarter of the pixels in the selected working frame buffer, one eighth of the pixels in the selected working frame buffer, or other percentages such as any one Nth of the pixels, where N is a positive integer, depending on the specific interleaving pattern used. Furthermore, in other embodiments the interleaving pattern may be modified. For example, the interleaving pattern may comprise horizontally alternating lines from the transparent graphics frame buffer and the operating system software frame buffer. Alternatively, the interleaving pattern may comprise vertically alternating lines from the transparent graphics frame buffer and the operating system software frame buffer. A combination of a checkerboard pattern and horizontally or vertically alternating lines may also be used. One skilled in the art will realize that various interleaving patterns may be used in embodiments of the present invention with varying degrees of transparent effect, and the invention is not limited in scope to any particular pattern.

In another embodiment of the present invention, the interleaving pattern may be changed over time at a periodic or non-periodic rate or in a predetermined manner. For example, use of any two of the different interleaving patterns described above may be alternated, such that a first interleaving pattern is used for a first generation of the transparent graphics frame buffer and a second interleaving pattern is used for a second, succeeding generation of the transparent graphics frame buffer. This process may be repeated, thereby implementing a hybrid spatial, color-mixed, and temporal transparency method.

It should be noted that each pixel in the transparent frame buffer may be used more than once, or not at all, to achieve a stretching or shrinking effect in the resulting transparency output. The frequency and location of pixel re-use or omission depends at least in part on the desired amount of stretching or shrinking.

Figure 6:
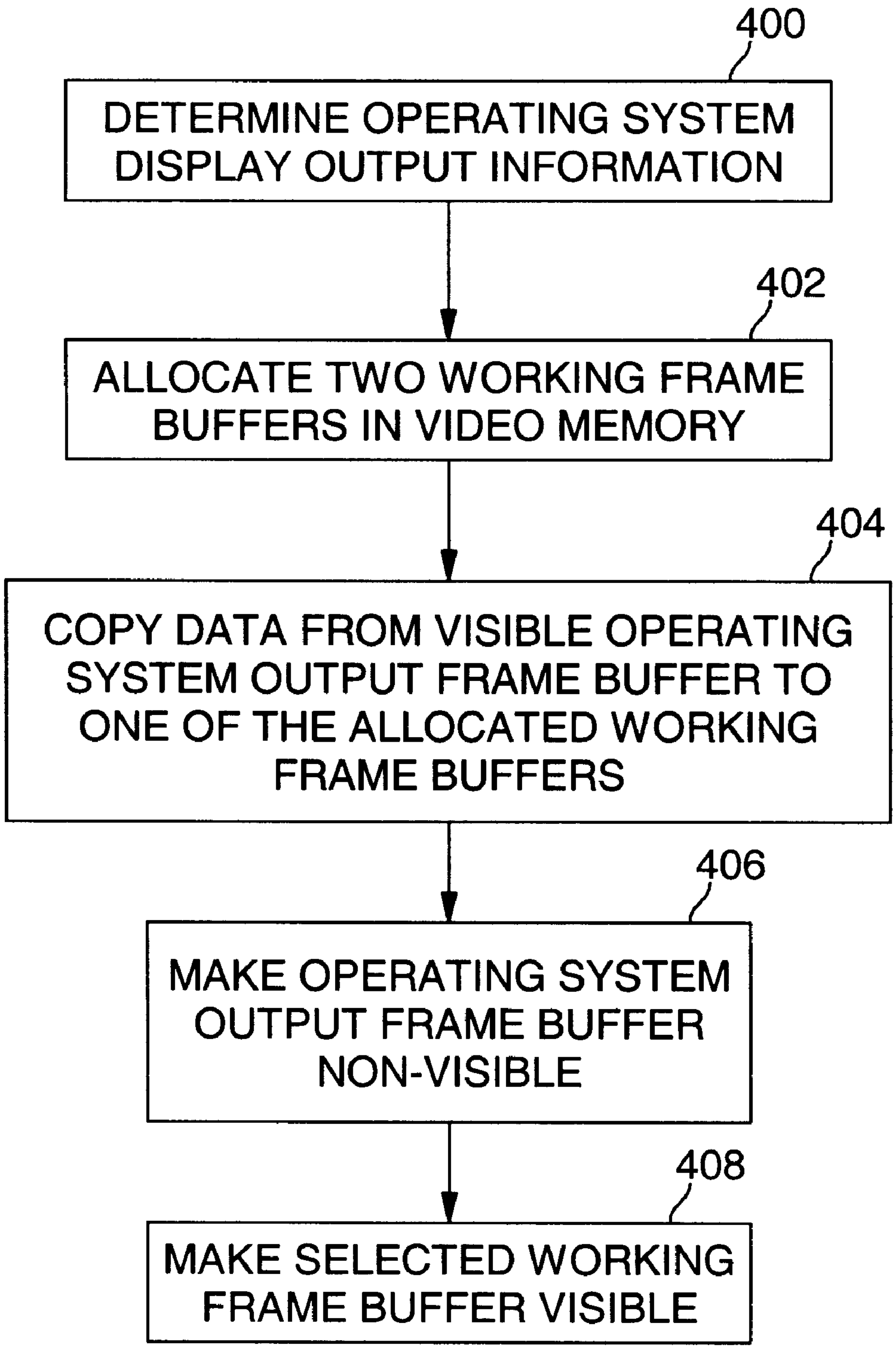
FIG. 6 is a flow diagram for initializing a system to provide transparent graphics according to one embodiment of the present invention.

FIG. 6 is a flow diagram illustrating an embodiment for initializing a system to provide transparent graphics. At block 400, the operating system display output control information is determined. This control information comprises the size of the display, color resolution, and other data. Next, at block 402, two working frame buffers are allocated in video memory in this embodiment. These operations are performed by calls to the video control API in this embodiment. At block 404, a block transfer operation is performed to copy data from the normally visible operating system output frame buffer to a selected one of the two working frame buffers. Assume for this example that the second working frame buffer is selected first, although the first working frame buffer may also be used as the initial working frame buffer. The block transfer is performed by a call to the video control API in this embodiment. At block 406, the operating system output frame buffer is set to a "non-visible" state by a call to the video control API. At block 408, the selected working frame buffer (for example, the second working frame buffer) is made visible by a call to the video control API in this embodiment. In some embodiments, block 406 and block 408 are accomplished by a single call to the video control API. At this point, the video card's current display output data is obtained from the selected working frame buffer, not the operating system output frame buffer. In alternate embodiments, other APIs may also be used to effect the same results.

Figure 7:
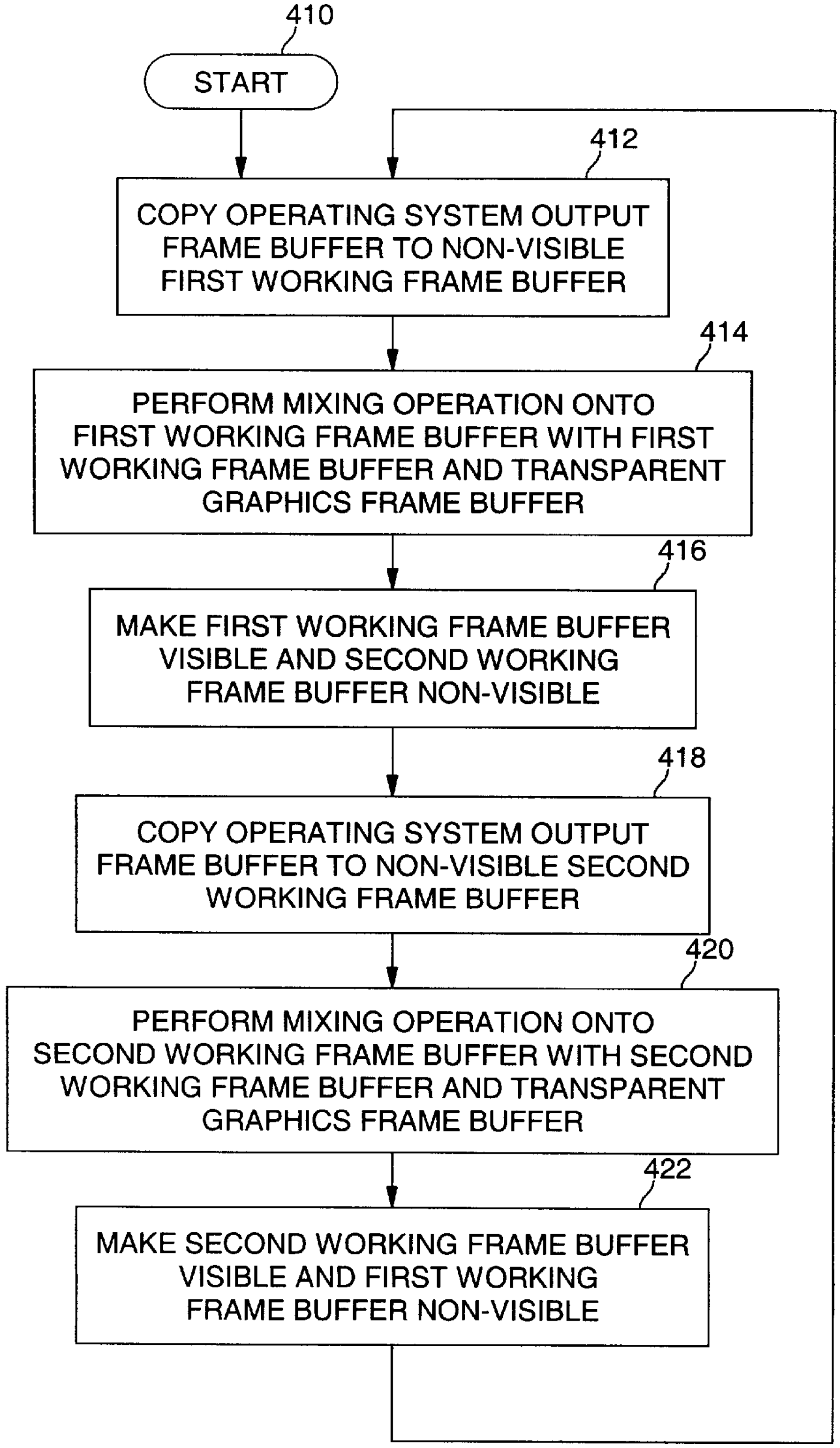
FIG. 7 is a flow diagram showing double buffering control processing according to one embodiment of the present invention.

FIG. 7 is a flow diagram showing an embodiment of double buffering control processing. After starting block 410, a block transfer operation is performed at block 412 to copy the operating system output frame buffer to the non-visible first working frame buffer by a call to the video control API in this embodiment. At block 414, an operation is performed to write the mixed and interleaved contents of the first working frame buffer and the transparent graphics frame buffer to the first working frame buffer. At block 416, the first working frame buffer is made visible and the second working frame buffer is made non-visible, in effect, flipping the two frame buffers as the current display output data source. At block 418, a block transfer operation is performed to copy the operating system output frame buffer to the non-visible second working frame buffer by a call to the video control API in this embodiment. At block 420, an operation is performed to write the color mixed and interleaved contents of the second working frame buffer and the transparent graphics frame buffer to the second working frame buffer. At block 422, the second working frame buffer is made visible and the first working frame buffer is made non-visible, in effect, flipping the two frame buffers as the current display output data source. This process is repeated by returning to block 412. During each of the previous blocks, the operating system software may be concurrently writing additional display data into the operating system output frame buffer.

Figure 8:
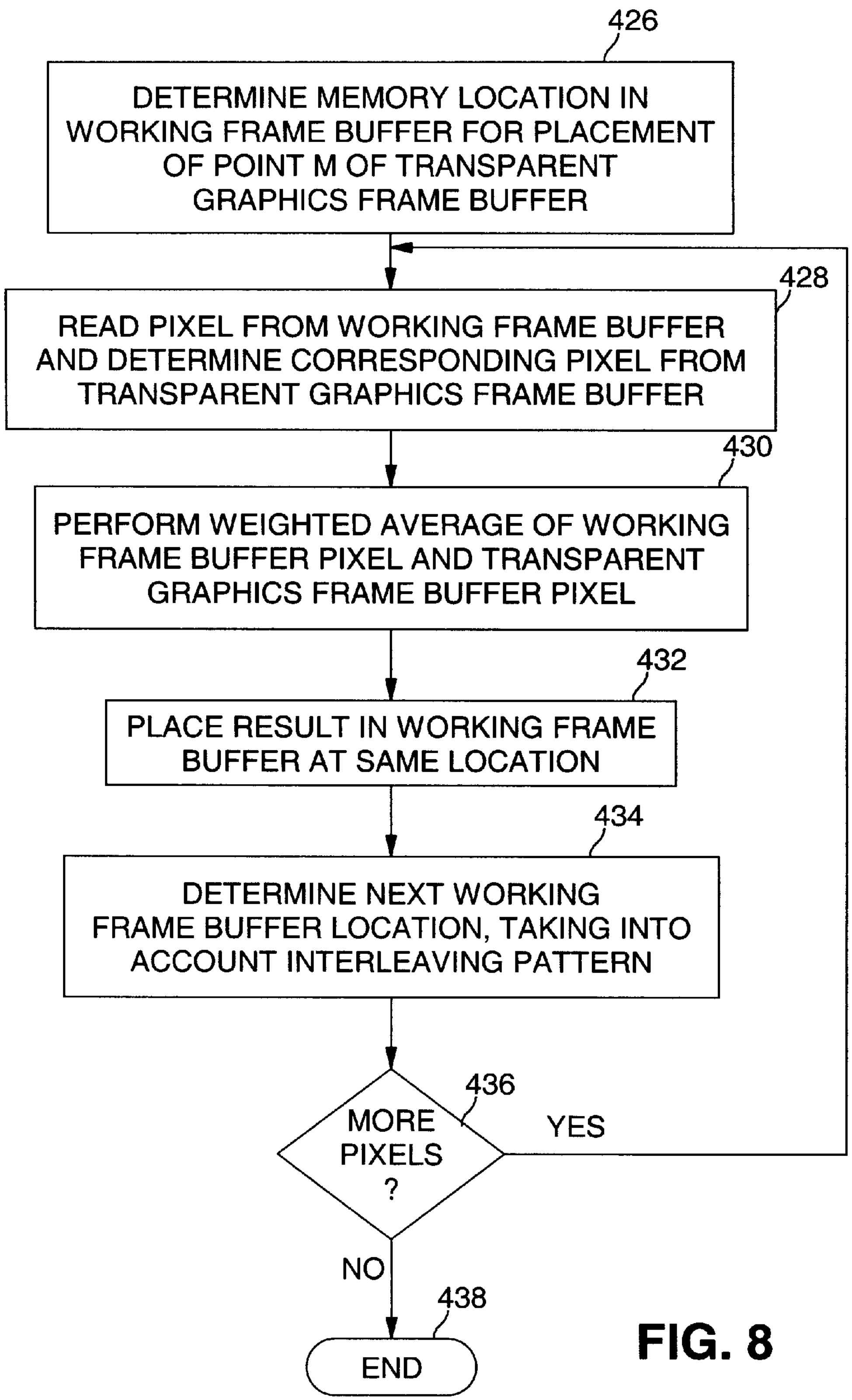
FIG. 8 is a flow diagram of color mixing and interleaving processing according to one embodiment of the present invention.

The color mixing and interleaving operation of blocks 414 and 420 is further described with reference to FIG. 8. At block 426, a memory location in the currently non-visible (either the first or the second) working frame buffer is determined for a reference point (e.g., point M 304) of the transparent graphics frame buffer. At block 428, a data signal value for a pixel from the currently non-visible working frame buffer is read and the spatially corresponding pixel(s) from the transparent graphics frame buffer is determined. This correspondence is not necessarily a 1:1 ratio since the transparent graphics frame buffer image may be stretched or reduced to fit a portion of the working frame buffer. This pixel correspondence determination is well known in the art and is commonly used in stretch block transfers in operating system software (e.g., the StretchBlt function in the Windows95® operation system). Next, at block 430, in this embodiment the weighted average of the pixel from the working frame buffer and the pixel from the transparent graphics frame buffer is computed. The weighted averages of the individual pixel components are determined on a color component by color component basis. That is, red components are averaged, blue components are averaged, and green components are averaged. The weight that is given to each of the components determines the resulting transparency of the pixel, however the same weight value may be used for all components of a given pixel. It is the weight associated with a pixel that affects at least in part the level of transparency. These weights may be manipulated by the application program employing transparency to achieve various mixing ratios. Furthermore, the application program employing transparency may provide user interface elements that allow the user to control the mixing ratios directly or indirectly.

The result of the weighted averaging computation is placed into the same location in the working frame buffer at block 432 as the current pixel being processed. At block 434, the next location in the working frame buffer to be processed is determined, taking into account the current interleaving pattern (e. g., using every second pixel, every fourth pixel, horizontally or vertically alternating lines, etc.). At block 436, if more pixels of the working frame buffer and the transparent graphics frame buffer are to be processed, processing continues with block 428 with the next pixel. Otherwise, color mixing and interleaving processing ends at block 438.

In another embodiment of the present invention, transparent graphics effects may be produced by time multiplexing display output data instead of or in addition to color mixing and interleaving. In this embodiment, producing transparent graphics layers is accomplished by inducing the human eye to average two overlapping screens of information. The screens may be presented to the user on a single display, such as a computer monitor, for example, but the effect is that there are two substantially concurrently visible layers of information. This effect is produced by flipping, at a rate, for example, of at least 40 cycles per second, two distinct video frame buffers (wherein a cycle is the display of both distinct video frame buffers in succession).

This embodiment works by flipping between the display of two different frame buffers at a high rate. By flipping fast enough, the human eye is unable to distinguish between the two image sources, resulting in the illusion of two screens of information layered one on top of another. For example, referring back to FIG. 4, data signals from the transparent graphics frame buffer 18 and the operating system output frame buffer 10 may be used as follows. First, the data signals from the operating system output buffer is displayed on the computer monitor (not shown). Next, data from the transparent graphics frame buffer is copied into a selected one of either first working frame buffer 300 or second working frame buffer 302. This copy operation may, in one embodiment, also be performed by a block transfer command. The selected working frame buffer is then displayed on the computer monitor. This process is repeated at a high enough rate to result in the human eye perceiving the image from the transparent graphics frame buffer overlaying the image from the operating system output frame buffer.

This embodiment of a method for creating transparent graphics employs no mixing of pixel values. Instead, it relies on the human eye's inability to distinguish between two rapidly alternating image sources (in essence, the human eye does the averaging on a pixel by pixel basis). As a result, mixing of the frame buffer data may be omitted, but the effect of transparency may still be achieved. This may result in a decrease in the processing power needed to provide transparent graphics.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention

What is claimed is:

1. In a system having an output frame buffer to store pixels of display output data for the system, a method of creating transparent graphics comprising:

color mixing selected pixels of a first frame buffer with pixels of the output frame buffer to produce color mixed pixels;

interleaving pixels of the output frame buffer and the color mixed pixels and storing the interleaved pixels in a second frame buffer; and displaying the pixels of the second frame buffer.

2. The method of claim 1, wherein the first frame buffer resides in a main memory of the system and the second frame buffer resides in a video memory of the system.

3. The method of claim 1, wherein color mixing comprises averaging color component values of pixels of the first frame buffer with color component values of spatially corresponding pixels of the output frame buffer.

4. The method of claim 3, wherein the averaging of color component values of pixels comprises weighted averaging of color component values of pixels of the first frame buffer with color component values of pixels of the output frame buffer.

5. The method of claim 1, wherein interleaving pixels comprises selecting pixel locations in the second frame buffer to store color mixed pixels.

6. The method of claim 5, wherein selecting pixel locations comprises selecting one of every Nth pixel location of the second frame buffer, wherein N is a positive integer.

7. The method of claim 5, wherein selecting pixel locations comprises selecting pixel locations in the second frame buffer according to a predetermined interleaving pattern.

8. The method of claim 7, wherein selecting pixel locations in the second frame buffer according to a predetermined interleaving pattern comprises changing the predetermined interleaving pattern at a periodic rate.

9. In a system having a video memory and a main memory, the system executing instructions of an operating system controlling an output frame buffer to store display output data for the system, a method of creating transparent graphics comprising:

providing a first frame buffer to store pixels of display components to be displayed transparently;

allocating second and third frame buffers in video memory;

selecting one of the second and third frame buffers;

copying pixels of the output frame buffer to the selected frame buffer;

color mixing selected pixels of the first frame buffer with pixels of the selected frame buffer to produce color mixed pixels;

storing the color mixed pixels in selected locations of the selected frame buffer; and displaying the pixels of the selected frame buffer.

10. The method of claim 9, further comprising: p1 selecting one of the second and third frame buffers not selected in the immediately preceding selecting act; and repeating said copying, color mixing, storing, and displaying acts.

11. The method of claim 9, wherein color mixing comprises:

determining a location in the selected frame buffer for placement of a color mixed pixel;

reading a pixel from the selected frame buffer and determining a corresponding pixel in the first frame buffer;

determining a weighted average of the pixel from the selected frame buffer and the corresponding pixel in the first frame buffer; and storing the weighted average in the selected frame buffer at the location.

12. The method of claim 11, wherein determining a weighted average comprises determining a weighted average of each color component value of the pixel of the selected frame buffer and a corresponding color component value of a corresponding pixel of the first frame buffer.

13. The method of claim 12, wherein each color component value of the pixel of the first frame buffer is weighted by a predetermined value.

14. The method of claim 11, wherein determining a location comprises selecting every Nth pixel of the selected frame buffer, wherein N is a positive integer.

15. An apparatus for creating transparent graphics comprising:

a processor for executing programming instructions; and a storage medium having stored therein a plurality of programming instructions to be executed by the processor, wherein when executed, the plurality of programming instructions color mix selected pixels of a first frame buffer with pixels of a output frame buffer to produce color mixed pixels, interleave pixels of the output frame buffer and the color mixed pixels, store the interleaved pixels in a second frame buffer, and display the pixels of the second frame buffer.

16. The apparatus of claim 15, further comprising a main memory to store the first frame buffer and a video memory to store the output frame buffer and the second frame buffer.

17. The apparatus of claim 15, wherein the programmed instructions further comprise instructions to color mix pixels by determining the weighted average of color component values of pixels of the first frame buffer with color component values of spatially corresponding pixels of the output frame buffer.

18. The apparatus of claim 15, wherein the programmed instructions further comprise instructions to interleave pixels by selecting alternating pixel locations in the second frame buffer to store the color mixed pixels.

19. A machine readable medium having stored therein a plurality of machine readable instructions executable by a processor, the machine readable instructions comprising instructions to color mix selected pixels of a first frame buffer with pixels of an output frame buffer to produce color mixed pixels, to interleave pixels of the output frame buffer and the color mixed pixels, to store the interleaved pixels in a second frame buffer; and to display the pixels of the second frame buffer.

20. The machine readable medium of claim 19, wherein the machine readable instructions further comprise instructions to color mix pixels by determining the weighted average of color component values of pixels of the first frame buffer with color component values of spatially corresponding pixels of the output frame buffer.

21. The machine readable medium of claim 19, wherein the machine readable instructions further comprise instructions to interleave pixels by selecting alternating pixel locations in the second frame buffer from which to calculate and to store the color mixed pixels.

22. An apparatus for creating transparent graphics comprising:

means for mixing selected pixels of a first frame buffer with pixels of an output frame buffer to produce color mixed pixels;

means for interleaving pixels of the output frame buffer and the color mixed pixels and storing the interleaved pixels in a second frame buffer; and means for displaying the pixels of the second frame buffer.

23. The apparatus of claim 22, wherein the mixing means comprises means for determining the weighted average of color component values of pixels of the first frame buffer with color component values of spatially corresponding pixels of the output frame buffer.

24. The apparatus of claim 22, wherein the interleaving means comprises means for selecting alternating pixel locations in the second frame buffer to store the color mixed pixels.

25. A machine readable medium having stored therein a plurality of machine readable instructions executable by a processor, the machine readable instructions comprising instructions to allocate a first frame buffer to store pixels of display components to be displayed transparently, to allocate second and third frame buffers in a video memory, to select one of the second and third frame buffers, to copy pixels of an output frame buffer to the selected frame buffer, to mix selected pixels of the first frame buffer with pixels of the selected frame buffer to produce color mixed pixels, to store the color mixed pixels in selected locations of the selected frame buffer; and to display the pixels of the selected frame buffer.

26. In a system having an output frame buffer to store pixels of display data to be displayed on a monitor of the system, a method of creating transparent graphics comprising:

providing a first frame buffer to store display components to be displayed transparently on the monitor, the display components comprising a plurality of pixels;

providing a second frame buffer;

displaying pixels of the output frame buffer on the monitor;

copying pixels of the first frame buffer to the second frame buffer; and displaying the pixels of the second frame buffer on the monitor.

27. The method of claim 26, further comprising repeating the displaying and copying acts at a predetermined rate of at least 40 cycles per second.

28. The method of claim 26, wherein copying pixels of the first frame buffer comprises color mixing selected pixels of the first frame buffer with spatially corresponding pixels of the output frame buffer.

* * * * *